United States Patent
Taniguchi et al.

[11] Patent Number: 5,989,379
[45] Date of Patent: Nov. 23, 1999

[54] METHOD FOR MANUFACTURING A COMPOSITE OPTICAL DEVICE

[75] Inventors: Tadashi Taniguchi; Yoshitsugu Fujimaki, both of Kanagawa, Japan

[73] Assignee: Sony Corporation, Tokyo, Japan

[21] Appl. No.: 08/961,651

[22] Filed: Oct. 31, 1997

Related U.S. Application Data

[62] Division of application No. 08/564,644, Nov. 29, 1995.

[30] Foreign Application Priority Data

Nov. 29, 1994 [JP] Japan ................................. 6-319291

[51] Int. Cl.⁶ ............................. B32B 31/18; B32B 31/28
[52] U.S. Cl. ....................... 156/250; 156/275.7; 156/278; 156/289; 359/514
[58] Field of Search ................................ 156/250, 275.7, 156/278, 280, 289; 359/514, 833, 837

[56] References Cited

U.S. PATENT DOCUMENTS

| | | |
|---|---|---|
| 4,333,173 | 6/1982 | Yonezawa et al. . |
| 4,411,492 | 10/1983 | Bluege . |
| 5,095,389 | 3/1992 | Yokomori ................................ 359/833 |
| 5,235,589 | 8/1993 | Yokomori et al. . |
| 5,339,441 | 8/1994 | Kardos et al. ....................... 359/833 X |
| 5,350,917 | 9/1994 | Taniguchi et al. . |
| 5,396,061 | 3/1995 | Taniguchi et al. . |
| 5,438,586 | 8/1995 | Ishii et al. . |
| 5,719,389 | 2/1998 | Taniguchi et al. . |
| 5,739,931 | 4/1998 | Zimmerman et al. . |
| 5,790,327 | 8/1998 | Lee et al. ................................ 359/833 |

FOREIGN PATENT DOCUMENTS

5-323119  12/1993  Japan .

*Primary Examiner*—Curtis Mayes
*Attorney, Agent, or Firm*—Hill & Simpson

[57] ABSTRACT

A composite optical device comprises an optical element bonded onto a support body with an adhesive, at least a part of surfaces of the optical element being covered by a film made of a hydrophilic material. A method for manufacturing a composite optical device having an optical element bonded onto a support body with an adhesive, comprises the steps of: preparing a bar-shaped optical element having a length not less than twice the width thereof and having surfaces at least a part of which is covered by a film made of a hydrophilic material, and bonding the bar-shaped optical element on the support body with the adhesive; and cutting the bar-shaped optical element, the adhesive and the support body while applying a liquid containing water at least to portions where they are cut.

11 Claims, 9 Drawing Sheets

METHOD FOR MANUFACTURING A COMPOSITE OPTICAL DEVICE

This is a division of application Ser. No. 08/564,644, filed Nov. 29, 1995.

BACKGROUND OF THE INVENTION

1. Field of the Invention

This invention relates to a composite optical device and its manufacturing method suitable for a composite optical device in which an optical element such as prism, for example, is bonded to a support body with an adhesive.

2. Related Art

Figure 1:
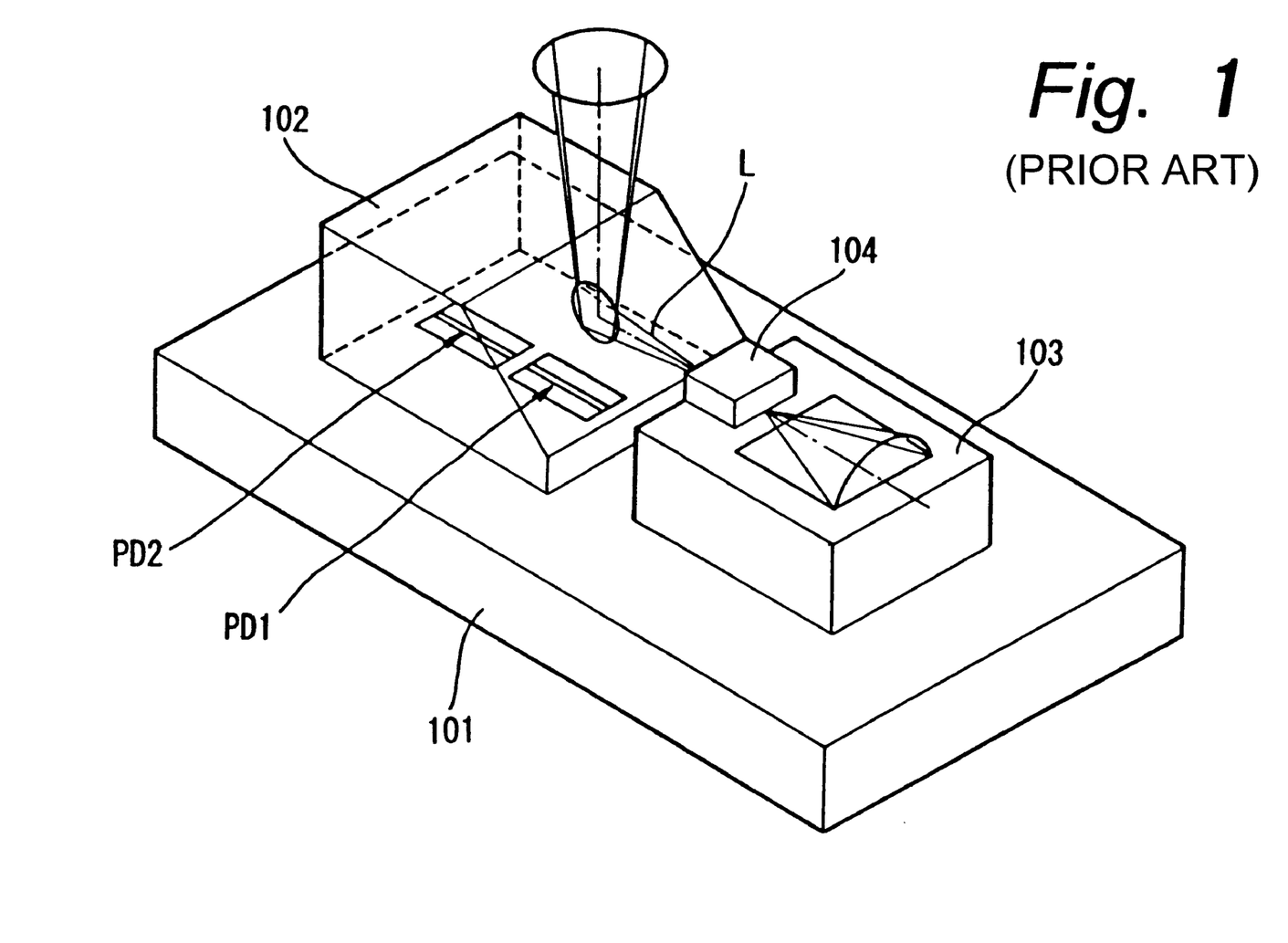
FIG. 1 is a perspective view showing a conventional laser coupler.
Figure 2:
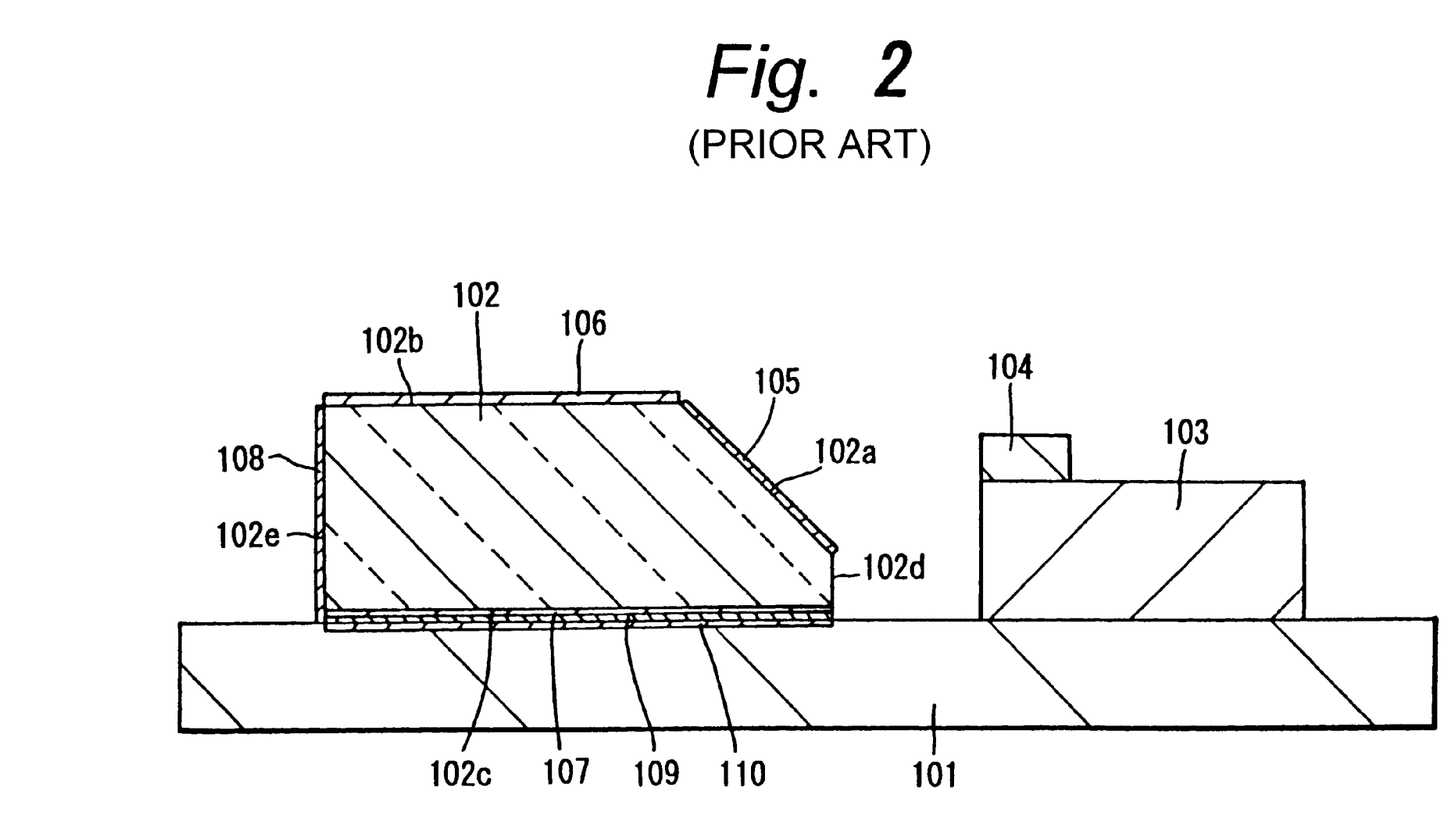
FIG. 2 is a cross-sectional view showing the conventional laser coupler.

Among conventional composite optical devices of this type, there is a device called laser coupler. Such a conventional laser coupler used as an optical pickup of a CD player, for example, is shown in FIGS. 1 and 2. FIG. 1 is a perspective view of the laser coupler, and FIG. 2 is a longitudinal cross-sectional view of the same laser coupler. As shown in FIGS. 1 and 2, the laser coupler comprises a microprism 102 made of optical glass and a LOP (laser on photodiode) chip consisting of a photodiode 103 and a semiconductor laser 104 supported thereon, which are mounted on a photodiode IC 101 in a close relationship. The photodiode IC 101 includes a pair of photodiodes PD1 and PD2 for detecting an optical signal, a current-to-voltage (I-V) converting amplifier and an arithmetic processing unit (not shown) which all are incorporated into IC. The photodiode 103 is configured to monitor light output from a rear end surface of the semiconductor laser 104 and to control light output from a front end surface of the semiconductor laser 104.

As shown in FIG. 2, the microprism 102 has a half mirror 105 on its slanted surface 102a, a total reflection film 106 on its top surface 102b, an antireflection film 107 on its bottom surface 102c, a mirror plane comprising its end surface 102d facing to the LOP chip, and a light absorbing film 108 on its end surface 102e opposite from the LOP chip. The antireflection film 107 on the bottom surface 102c of the microprism 102 is covered by a $SiO_2$ film 109. The microprism 102 is mounted on the photodiode IC 101 by an adhesive 110 applied to the $SiO_2$ film 109. The $SiO_2$ film 9 is used to reinforce the adhesive force of the adhesive 110 for holding the microprism 102 on the photodiode IC 101. Used as the half mirror 105 is, for example, an amorphous Si film which is made by vacuum evaporation. Used as the total reflection film 106 is, for example, a dielectric multi-layered film including 20 layers of $SiO_2$ and 20 layers of $TiO_2$ which are stacked alternately. Used as the antireflection film 107 is, for example, a $CeF_3$ film. Used as the light absorbing film 108 is, for example, a Cr/CrO-based multi-layered film. In certain cases, the microprism 102 has a half mirror on one half of the antireflection film 107 on the bottom surface 102c located nearer to the LOP chip.

Figure 3:
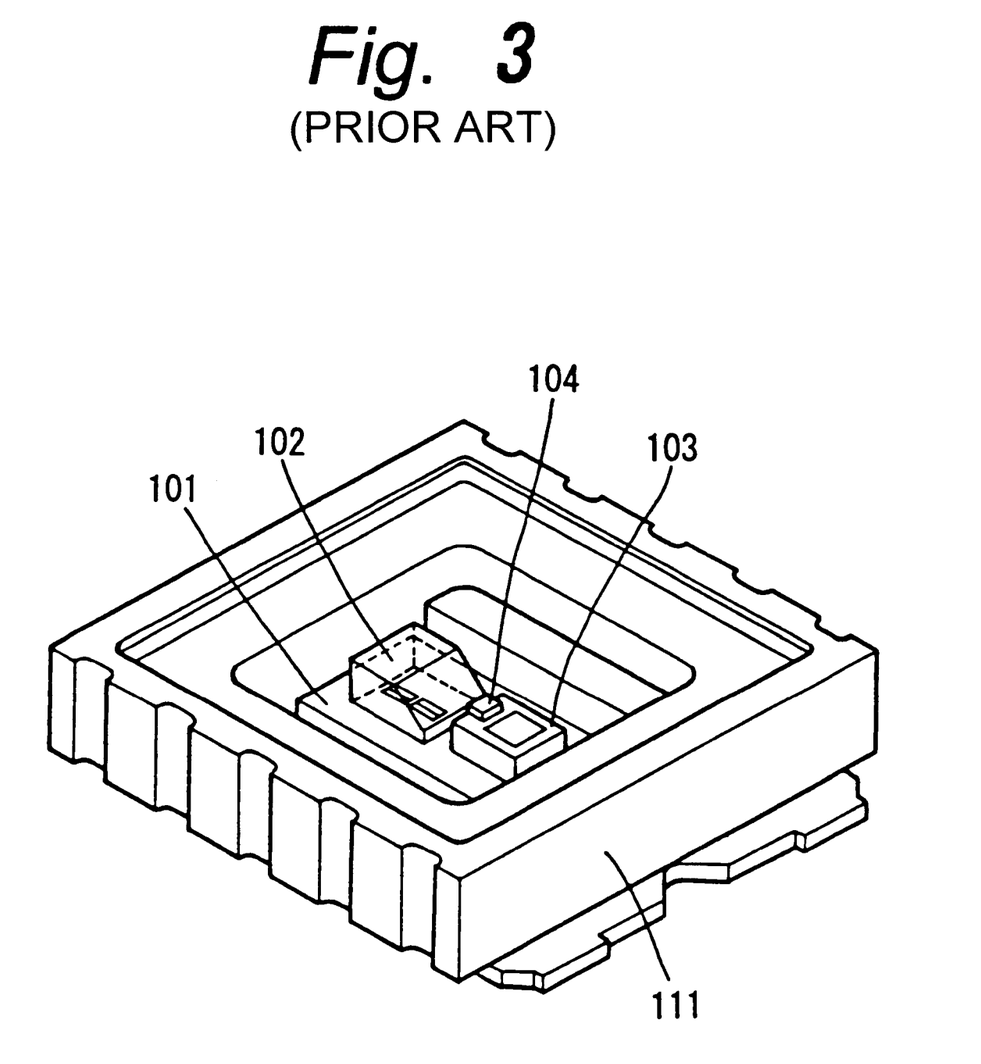
FIG. 3 is a perspective view showing the conventional laser coupler which is packaged in the form of a flat package.

The laser coupler having the above construction is contained in a flat package 111 made of, for example ceramics, and sealed by a window cap, as shown in FIG. 3.

As shown in FIGS. 1 and 2, in the laser coupler described above, a laser beam L exerted from the front end surface of the semiconductor laser 104 is reflected by the half mirror 105 on the slanted surface 102a of the microprism 102, and runs toward a disc (not shown) for reading a signal from the laser beam L. The laser beam L reflected by the disc passes through the half mirror 105 and enters in the microprism 102 from its slanted surface 102a. One half of the beam enters into the photodiode PD1, and the other half beam enters into the photodiode PD2 after sequentially reflected by the surface of the photodiode PD1 and the top surface 102b of the microprism 102. When the laser beam L focalizes on a recording plane of the disc, spot sizes on front and rear photodiodes PD1 and PD2 are equal; however, if the focalization is out of the recording plane, then the spot sizes on the photodiodes PD1 and PD2 differ from each other. Then, if the deviation of focalization appears as a difference between output signals from the photodiodes PD1 and PD2, a focus error signal can be detected. The point where the focus error signal is zero corresponds to the point in which the focalized position lies on the recording plane of the disc, that is, the just focus point. By a feedback control of a focus servo system such that the focus error signal becomes zero, the just-focus state can be maintained, and the disc can be reproduced in a good condition.

Conventional laser coupler, as described above, are manufactured in the following method.

Figure 4:
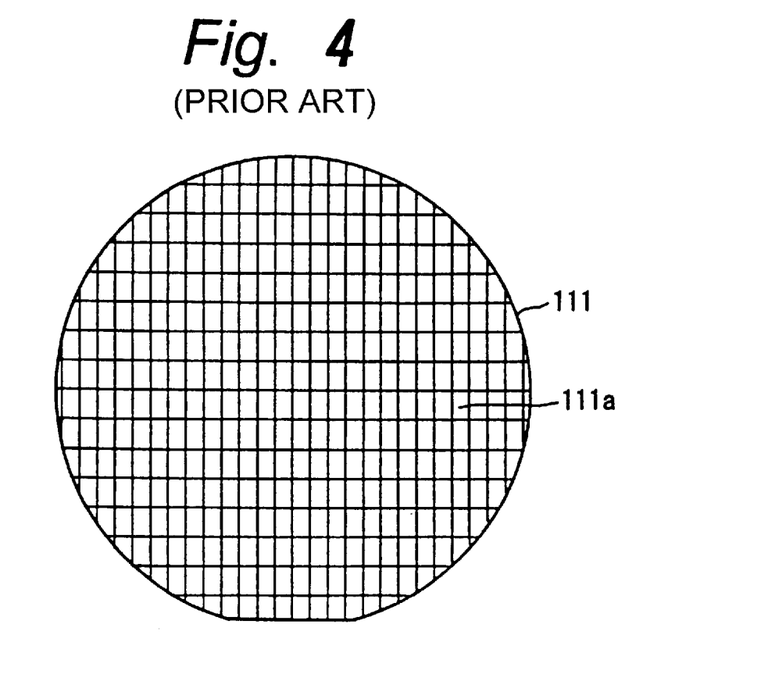
FIG. 4 is a schematic view for explaining a conventional method for manufacturing laser couplers.

As shown in FIG. 4, a photodiode IC wafer 111 is first prepared through a given wafer process. Reference numeral 111a denotes a chip region corresponding to a single photodiode IC.

Figure 5:
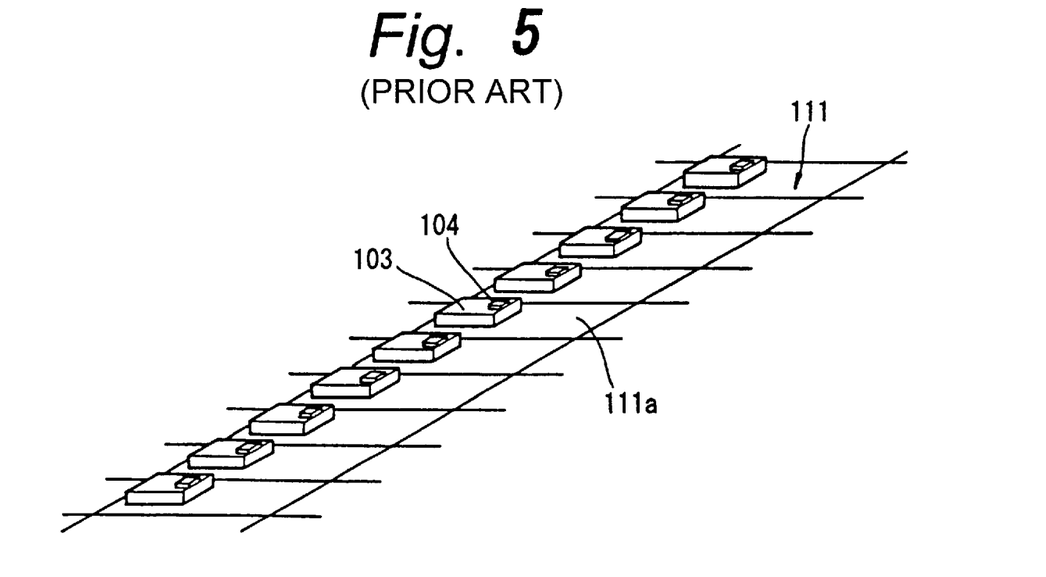
FIG. 5 is a schematic view for explaining the conventional method for manufacturing laser couplers.

Next, as shown in FIG. 5, LOP chips are mounted on respective chip regions 111a of the photodiode IC wafer 111 by silver paste (not shown) and then subjected to an appropriate curing treatment.

Figure 6:
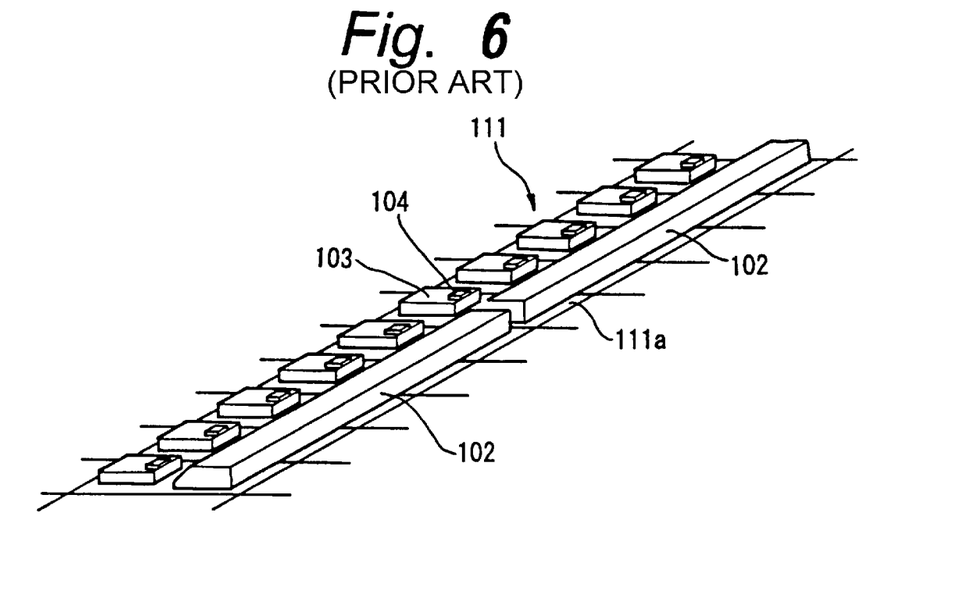
FIG. 6 is a schematic view for explaining the conventional method for manufacturing laser couplers.

In the next step, as shown in FIG. 6, bar-shaped microprisms 102 each extending over a plurality of chip regions 111a, e.g. ten chip regions, on the photodiode IC wafer 111 are provisionally fixed by using a silicone-resin-based adhesive (not shown) which cures when exposed to ultraviolet rays. After that, a curing treatment is effected, that is, the adhesive is set by irradiation of ultraviolet rays.

Figure 7:
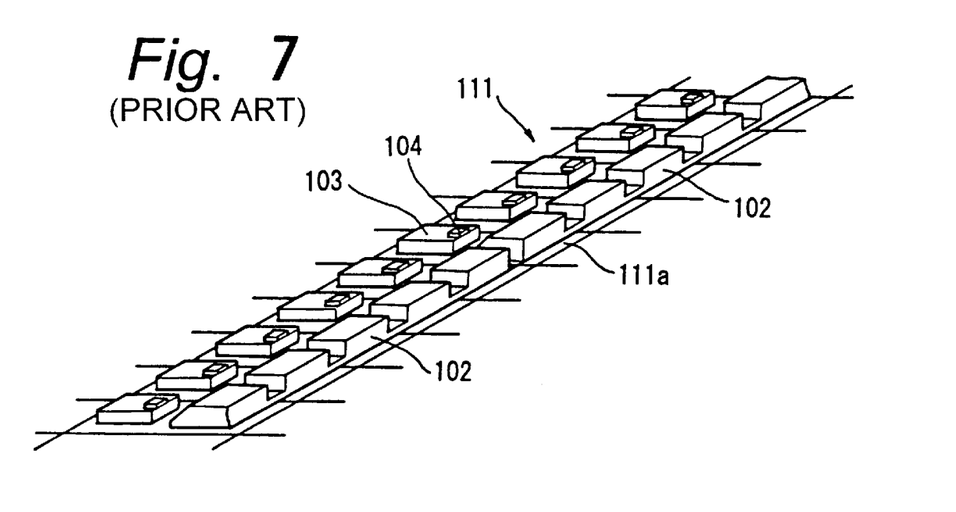
FIG. 7 is a schematic view for explaining the conventional method for manufacturing laser couplers.

In the next step, the back surface of the photodiode IC wafer 111 is bonded to an extensible sheet (not shown). Then, as shown in FIG. 7, each bar-shaped microprism 102 is half-cut by using an appropriate dicer (dicing unit, not shown).

Figure 8:
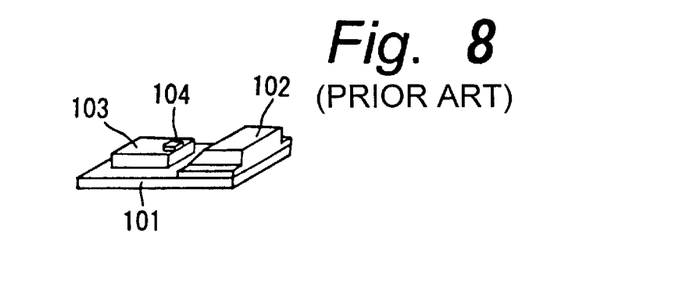
FIG. 8 is a schematic view for explaining the conventional method for manufacturing laser couplers.

After that, each bar-shaped microprism 102, adhesive 110 and photodiode IC wafer 111 are full-cut with the dicer to finally obtain separate chips, i.e. individual photodiode ICs, as shown in FIG. 8.

Then the extensible sheet is extended to isolate the respective chips from each other, and each chip is picked up and packaged as shown in FIG. 3.

In the conventional laser coupler manufacturing method described above, when the photodiode IC wafer 111 is full-cut by the dicer, the bar-shaped microprism 102, adhesive 110 and photodiode IC wafer 111 are cut sequentially. In this cutting process, swarf is produced and adheres on the surfaces of the microprism 102 and the photodiode IC 101. Since the slanted surface 102a and the top surface 102b of the microprism 102 behave as the plane of incidence of light and the light reflective plane, contamination of these surfaces adversely affect incidence and reflection of the laser beam L. To prevent this, the conventional method washes away the swarf by spraying water to the cut portion and the blade of the dicer during the cutting, and removes dust by spraying water and blowing dry air after the cutting.

Silicone resin, however, which is used as the adhesive 110, has a stickiness, its swarf adheres onto the surfaces of the microprism 102 and other element and remains even after the washing mentioned above.

This problem is not limited to laser couplers but applies to composite optical devices, in general, which are made by bonding a bar-shaped optical element on a support body by means of an adhesive, especially a resin-based adhesive, and subsequently cutting the semi-product into individual devices with an appropriate dicer or a like apparatus. Therefore, there is a strong demand for solution of the problem.

OBJECTS AND SUMMARY OF THE INVENTION

It is therefore an object of the invention to provide a composite optical device and its manufacturing method which can effectively prevent contamination of surfaces of an optical element by swarf produced upon cutting the optical element, adhesive and support body.

The present inventors made efforts to solve the above problem, and realized that washing by sprayed water, etc. is insufficient to prevent adhesion of dust or swarf onto surfaces of microprisms and other optical elements while the semi-product is cut by a dicer and that this problem is not overcome unless using a structural improvement to prevent swarf or dust from staying on surfaces of the optical element. As a result of a further progress of the study, the present inventors found that adhesion of dust onto surfaces of the optical element can be effectively prevented by covering surfaces of the optical element with a film made of a hydrophilic material before the cutting and by washing the cut portion and the dicer blade by sprayed water during the cutting.

According to an aspect of the invention, there is provided a composite optical device comprising:

an optical element bonded onto a support body with an adhesive, at least a part of surfaces of the optical element being covered by a film made of a hydrophilic material.

According to a further aspect of the invention, there is provided a method for manufacturing a composite optical device having an optical element bonded onto a support body with an adhesive, comprising the steps of:

preparing a bar-shaped optical element having a length not less than twice the width of the bar-shaped optical element and having surfaces at least a part of which is covered by a film made of a hydrophilic material, and bonding the bar-shaped optical element on the support body with the adhesive; and cutting the bar-shaped optical element, adhesive and support body while applying a liquid containing water at least to portions where they are cut.

In an embodiment of the latter aspect of the invention, the bar-shaped optical element, adhesive and support body are cut by a dicer. Typically, a liquid containing water as a major content is sprayed to the cut portion and the blade of the dicer during the cutting process.

In both aspects of the invention, at least the planes of incidence of the optical element are preferably covered with a film made of a hydrophilic material. Typically, however, both the planes of incidence and reflecting planes are covered with a film made of a hydrophilic material.

The optical element used in either the former or the latter aspect of the invention may be any required for the use or function of the composite optical device. The optical element is, for example, a prism.

In both aspects of the invention, the adhesive is typically an adhesive using a resin which cures when exposed to ultraviolet rays. An example of the adhesive is a silicone-resin-based adhesive.

In both aspects of the invention, the support body is typically a semiconductor substrate and, in particular, a semiconductor substrate on which a light emitting device such as semiconductor laser, a light detective device such as photodiode, or an electronic circuit is provided.

In both aspects of the invention, the hydrophilic material is at least one material chosen from the group consisting of, for example, $MgF_2$, $CaF_2$, CaO, MgO, $Al_2O_3$, BeO, ZnO, $TiO_2$, $SiO_2$, $SnO_2$, $Cu_3O$, $Na_2S$, $B_2O_3$, CaS and CuO.

The wettability of the hydrophilic film to water varies with material and with density and surface condition of the film. The density and surface condition of the film also varies with method and conditions for making the film. For example, even when such films are made of the same hydrophilic material, a film made by vacuum evaporation and a film made by sputtering are different in density and surface condition of the film. A $SiO_2$ film, taken as a specific example, exhibits a better wettability to water when having low density and denseness than that when having high density and denseness. Actually, the $SiO_2$ film greatly varies in angle of contact with water from 50° (very good wettability) to 90° (unacceptable wettability) depending on conditions for making it. Apparently, therefore, it is necessary to select as the hydrophilic material of the film a material having a wettability as high as possible and to select an appropriate method and appropriate conditions for making the film.

In a typical embodiment of either the former or the latter aspect of the invention, the composite optical device is a laser coupler.

According to a composite optical device according to the former aspect of the invention, since at least a part of surfaces of the optical element is covered with a film made of a hydrophilic material and the film exhibits a good wettability to water, a water layer is readily made on the surface when cutting the optical element, adhesive and support body simultaneously by a dicer or the like while spraying water to the cut portion and others. The water layer prevents swarf or dust produced during the cutting process from adhering onto the surface of the optical element. Even when swarf or dust adheres onto the surface of the optical element, since water readily enter into the interface between the swarf and the hydrophilic film, the swarf is readily removed by washing. As a result, the invention can effectively prevent that swarf or dust produced upon cutting the optical element, adhesive and support body adheres onto the surface of the optical element.

In a method for manufacturing a composite optical device according to the latter aspect of the invention, a bar-shaped optical element having a length not less than twice its width and having a surface at least a part of which is covered by a film made of a hydrophilic material is bonded onto a support body with an adhesive, and the bar-shaped optical element, adhesive and support body are cut while applying water at least to the cut portion. Therefore, like in the composite optical device according to the former aspect of the invention, the film made of a hydrophilic material effectively prevents swarf or dust caused by the cutting from adhering onto the surface of the optical element.

The above, and other, objects, features and advantage of the present invention will become readily apparent from the following detailed description thereof which is to be read in connection with the accompanying figures.

DETAILED DESCRIPTION OF THE PREFERRED EMBODIMENT

An embodiment of the invention is explained below with reference to the figures. In all figures of the embodiment, common or equivalent parts or elements are labelled with the same reference numerals.

Figure 9:
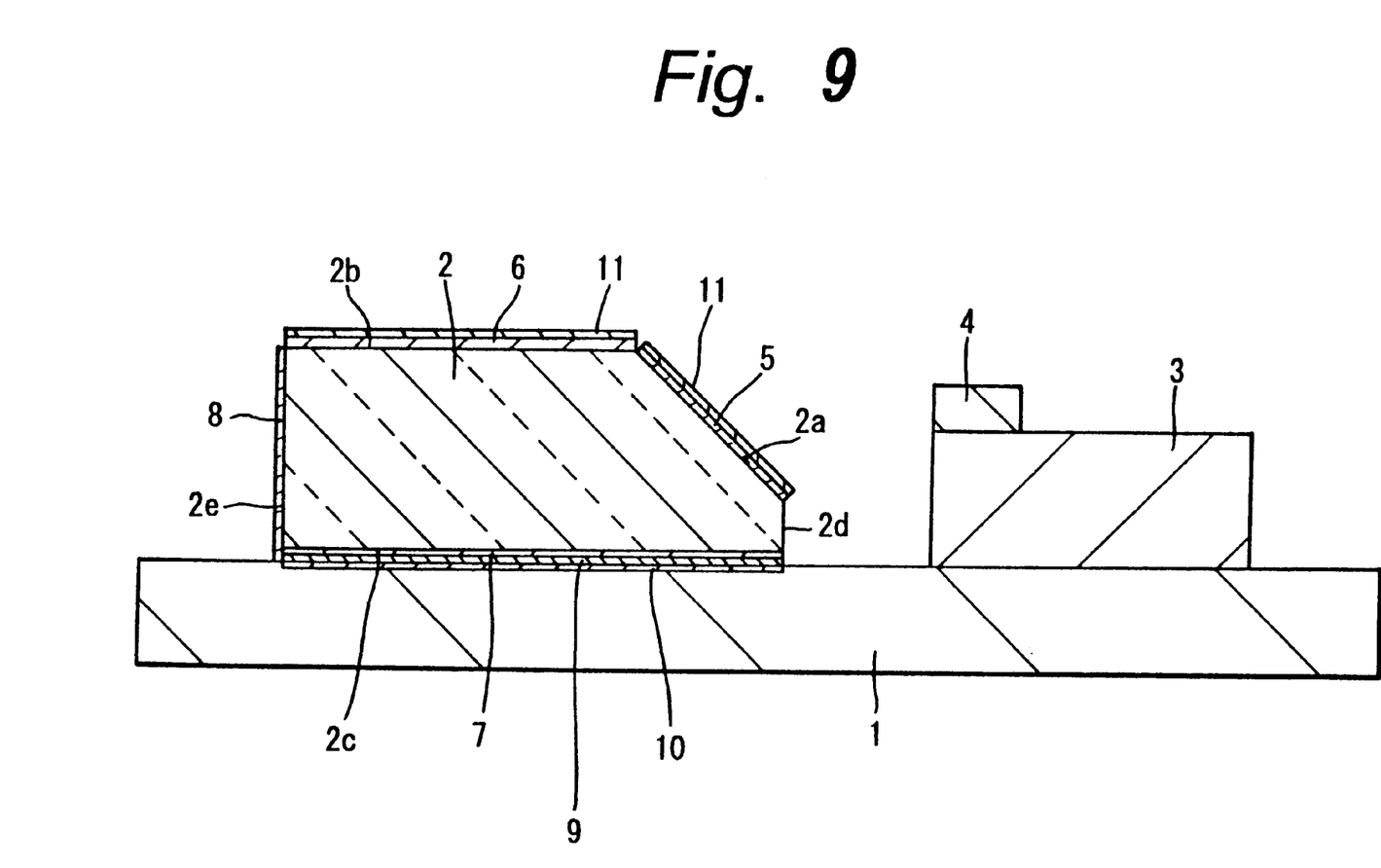
FIG. 9 is a cross-sectional view showing a laser coupler according to an embodiment of the invention.

FIG. 9 is a cross-sectional view showing a laser coupler according to an embodiment of the invention. The laser coupler according to the embodiment appears the same as FIG. 1 when viewed perspectively.

As shown in FIG. 9, the laser coupler according to the embodiment comprises a microprism 2 made of, for example, optical glass, and a LOP chip consisting of a photodiode 3 and a semiconductor laser 4 supported thereon, which are mounted on a photodiode IC 1 in a close relationship. The photodiode IC 1 includes a pair of photodiodes for detecting an optical signal, a current-to-voltage (I-V) converting amplifier and an arithmetic processing unit (none of them shown) which all are incorporated into IC. The photodiode 3 is configured to monitor light output from a rear end surface of the semiconductor laser 4 and to control light output from a front end surface of the semiconductor laser 4. The photodiode IC 1 and the photodiode 3 are made of, for example, Si chips, and a GaAs/AlGaAs semiconductor laser, for example, is used as the semiconductor laser 4.

The microprism 2 has a half mirror 5 on its slanted surface 2a, a total reflection film 6 on its top surface 2b, an antireflection film 7 on its bottom surface 2c, a mirror plane comprising its end surface 2d facing to the LOP chip, and a light absorbing film 8 on its end surface 2e opposite from the LOP chip. The antireflection film 7 on the bottom surface 2c of the microprism 2 is covered by a SiO₂ film 9. The microprism 2 is mounted on the photodiode IC 1 by an adhesive 10 applied to the SiO₂ film 9. The SiO₂ film 9 is used to reinforce the adhesive force of the adhesive 110 for holding the microprism 2 on the photodiode IC 1. Used as the half mirror 5 is, for example, an amorphous Si film which is made by vacuum evaporation. The reflectance of the half mirror 5 is, for example, 20%. Used as the total reflection film 6 is, for example, a dielectric multi-layered film including 20 layers of SiO₂ and 20 layers of TiO₂ which are stacked alternately. Used as the antireflection film 7 is, for example, a CeF₃ film. Used as the light absorbing film 8 is, for example, a Cr/CrO-based multi-layered film. In certain cases, the microprism 2 has a half mirror on one half of the antireflection film 7 on the bottom surface 2c located nearer to the LOP chip.

In the laser coupler according to the embodiment, in addition to the elements or members as those of the conventional laser coupler shown in FIGS. 1 and 2, a film 11 made of a hydrophilic material is provided to cover the half mirror 5 on the slanted surface 2a and the total reflection film 6 on the top surface 2b of the microprism 2. Used as the hydrophilic film 11 is, for example, a MgF₂ film.

The laser coupler having the above construction is contained in a flat package 111 made of, for example ceramics, and sealed by a window cap, in the same manner as shown in FIG. 3.

The laser coupler according to the embodiment behaves in the same manner as the conventional laser coupler discussed above, and its explanation is therefore omitted here.

Next explained is a method for manufacturing the laser coupler according to the embodiment.

Figure 10:
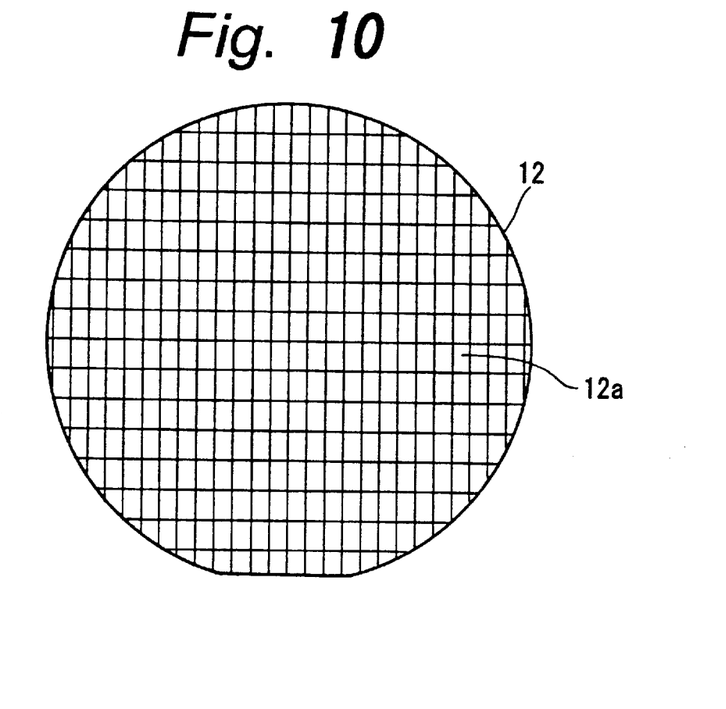
FIG. 10 is a schematic view for explaining a method for manufacturing the laser coupler according to the embodiment of the invention.

As shown in FIG. 10, a photodiode IC wafer 12 is first prepared through a given wafer process. Reference numeral 12a denotes a chip region corresponding to a single photodiode IC.

Figure 11:
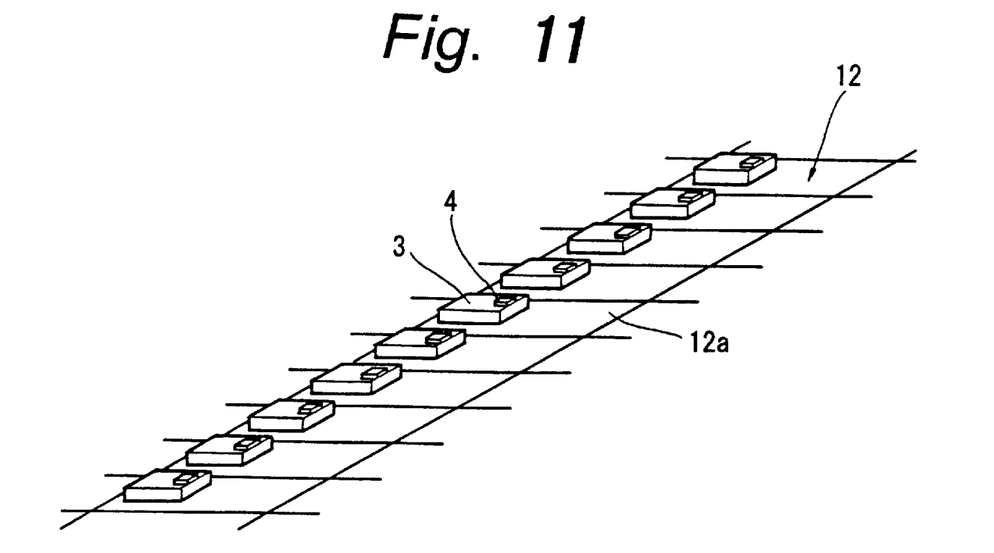
FIG. 11 is a schematic view for explaining the method for manufacturing the laser coupler according to the embodiment of the invention.

Next, as shown in FIG. 11, LOP chips are mounted on respective chip regions 12a of the photodiode IC wafer 12 by silver paste (not shown) and then subjected to an appropriate curing treatment.

Figure 12:
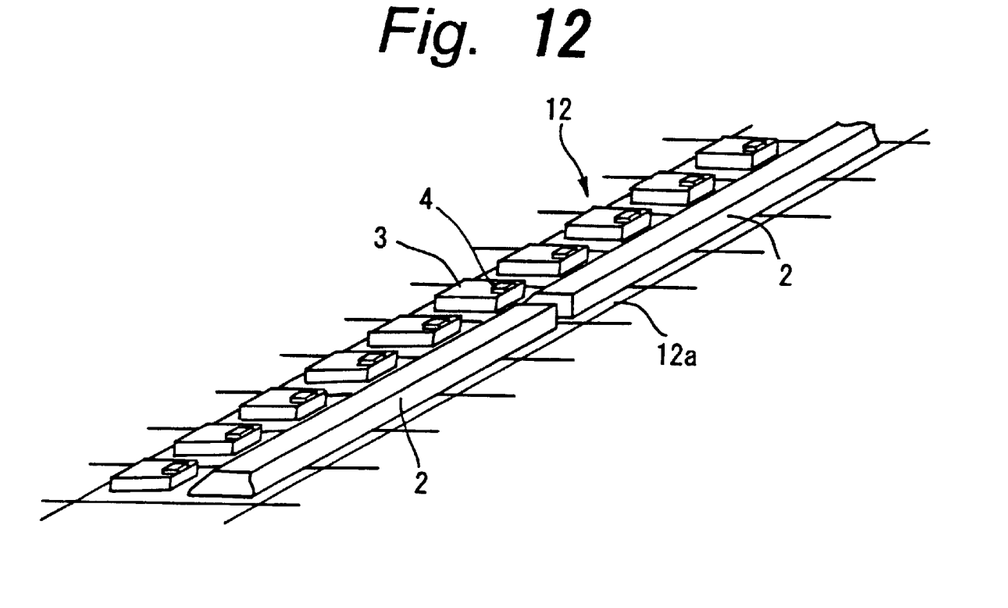
FIG. 12 is a schematic view for explaining the method for manufacturing the laser coupler according to the embodiment of the invention.

In the next step, as shown in FIG. 12, bar-shaped microprisms 2 are prepared, each of which is long enough, 18.6 mm for example, to extend over a plurality of chip regions 12a, e.g. ten chip regions, on the photodiode IC wafer 12. The bar-shaped microprisms 2 are provisionally fixed by using a silicone-resin-based adhesive (not shown) which cures when exposed to ultraviolet rays. After that, a curing treatment is effected, that is, the adhesive is set by irradiation of ultraviolet rays.

Figure 13:
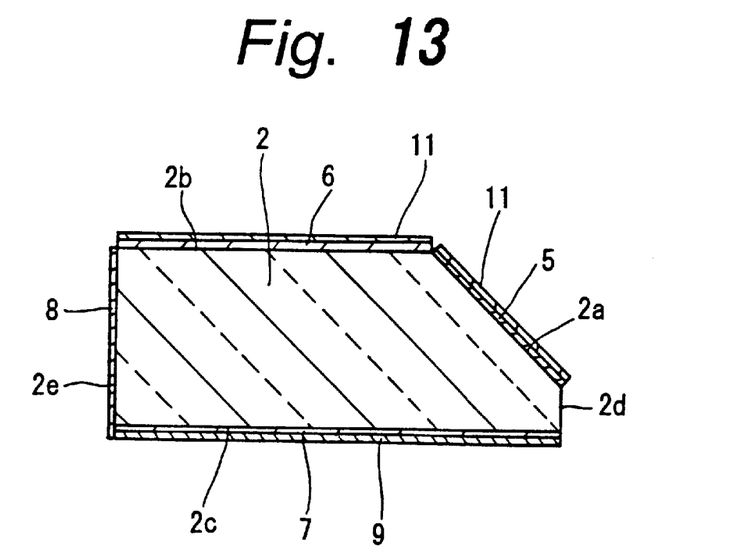
FIG. 13 is a cross-sectional view of a bar-shaped microprism used in the method for manufacturing the laser coupler according to the embodiment of the invention.

In this stage, as shown in FIG. 13, formed on the slanted surface 2a of each bar-shaped microprism 2 are the half mirror 5 and the hydrophilic film 11, on the top surface 2b are the total reflection film 6 and the hydrophilic film 11, on the bottom surface 2c are the antireflection film 7 and the SiO₂ film 9, on the end surface 2d is the mirror plane, and on the end surface 2e is the light absorbing film 8, respectively.

Figure 14:
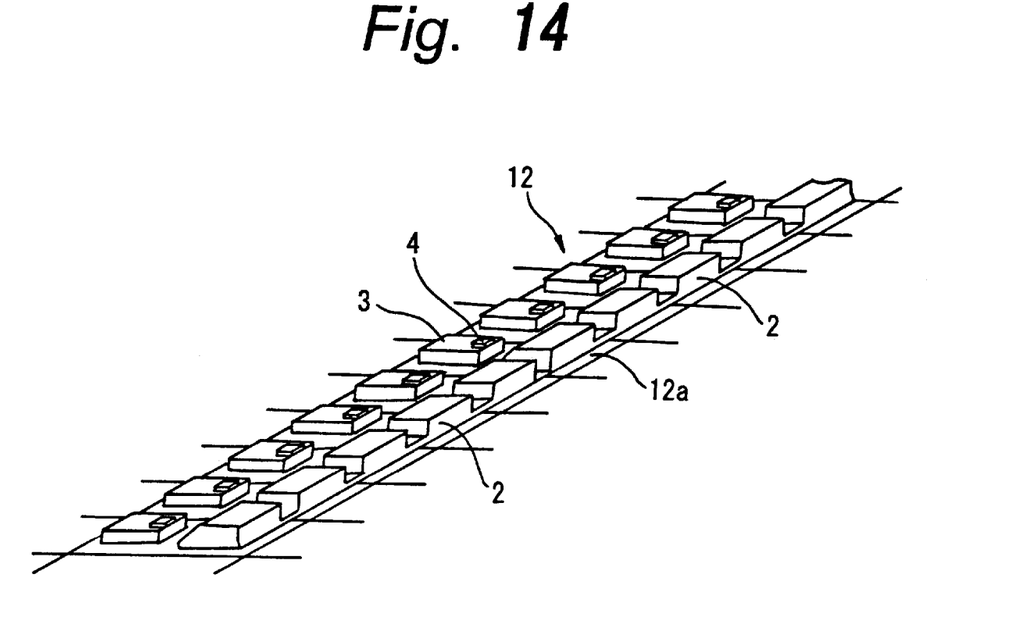
FIG. 14 is a schematic view for explaining the method for manufacturing the laser coupler according to the embodiment of the invention.

In the next step, the back surface of the photodiode IC wafer 12 is bonded to a drawing sheet (not shown). Then, as shown in FIG. 14, each bar-shaped microprism 2 is half-cut by using an appropriate dicer.

Figure 15:
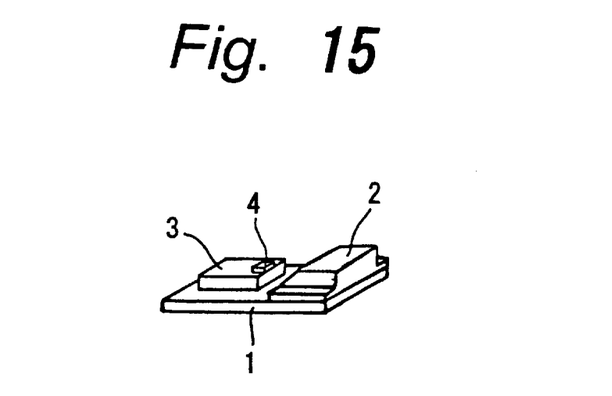
FIG. 15 is a schematic view for explaining the method for manufacturing the laser coupler according to the embodiment of the invention.

After that, each bar-shaped microprism 2, adhesive 10 and photodiode IC wafer 12 are full-cut with the dicer to finally obtain separate chips, i.e. individual photodiode ICs, as shown in FIG. 15. As a result, each bar-shaped microprism 2 are separated into ten microprisms 2, for example.

Then the extensible sheet is extended to isolate the respective chips from each other, and each chip is picked up and packaged in the same manner as shown in FIG. 3.

When performing the half cut of the bar-shaped microprism 2 and the full cut of the bar-shaped microprism 2, adhesive 10 and photodiode IC wafer 12, water is sprayed to the cut portion and to the blade of the dicer to wash away swarf or dust. After the cutting process, dust is removed by spraying water and blowing dry air. As shown in FIG. 13, since the outermost plane of the slanted surface 2a and the top surface 2b of the bar-shaped microprism 2, which are most liable to adhesion of dust, is the hydrophilic film 11, a water layer is formed on the hydrophilic film 11 during washing by sprayed water. Therefore, adhesion of swarf or dust onto the surfaces of the microprism 2 is greatly prevented. Even if such dust nevertheless adheres onto the surfaces of the microprism 2, water coercively enters into the interface between the dust and the hydrophilic film 11 and behaves to remove the dust.

As described above, according to the embodiment, since the slanted surface 2a and the top surface 2b of the microprism 2, on which swarf or dust is most liable to adhere, has the hydrophilic film 11 on the outermost layer, it is effectively prevented that such dust caused by the cutting of the microprism 2, adhesive 10 and photodiode IC wafer 12 adheres onto the surfaces of the microprism 2. As a result, deterioration of optical characteristics of the laser coupler can be prevented, and the manufacturing yield of laser couplers can be improved.

Having described a specific preferred embodiment of the present invention with reference to the accompanying figures, it is to be understood that the invention is not limited to that precise embodiment, and that various changes and modifications may be effected therein by one skilled in the art without departing from the scope or the spirit of the invention as defined in the appended claims.

For example, although the embodiment has been described above as being applied to a laser coupler, the invention can be applied to various composite optical devices other than the laser coupler.

As described above, according to the invention, since at least a part of surfaces of an optical element is covered with a film made of a hydrophilic material, adhesion of dust onto the surface of the optical element upon cutting the optical element, adhesive and their support body can be prevented successfully.

What is claimed is:

1. A method for manufacturing a composite optical device having a microprism bonded onto a support body with an adhesive, comprising the steps of:

preparing a bar-shaped microprism having a length not less than twice the width thereof and having total reflection and half-mirror surfaces at least a part of which is covered by a film characterized by a hydrophilic property which prevents silicone resin swarf from adhering to the part of the surfaces covered by the film, and bonding said bar-shaped microprism on said support body with said adhesive; and cutting said bar-shaped microprism, said adhesive and said support body while applying a liquid containing water at least to portions where they are cut.

2. The method for manufacturing a composite optical device according to claim 1, wherein:

said step of cutting uses a dicer having a blade; and said liquid containing water is applied to said blade of said dicer while said bar-shaped microprism, said adhesive and said support body are cut.

3. The method for manufacturing a composite optical device according to claim 1, wherein at least said half mirror of said bar-shaped microprism is covered with said film characterized by a hydrophilic property.

4. The method for manufacturing a composite optical device according to claim 1, wherein at least a said total reflection surface of said bar-shaped optical element is covered with said film characterized by a hydrophilic property.

5. The method for manufacturing a composite optical device according to claim 1, wherein said film characterized by a hydrophilic property includes at least one material chosen from the group consisting of $MgF_2$, $CaF_2$, CaO, MgO, $Al_2O_3$, BeO, ZnO, $TiO_2$, $SiO_2$, $SnO_2$, $Cu_3O$, $Na_2S$, $B_2O_3$, CaS and CuO.

6. The method for manufacturing a composite optical device according to claim 1, wherein said adhesive is prepared by using a resin which sets when exposed to ultraviolet rays.

7. The method for manufacturing a composite optical device according to claim 6, wherein said adhesive is based on silicone resin.

8. The method for manufacturing a composite optical device according to claim 1, wherein said support body is a semiconductor substrate.

9. The method for manufacturing a composite optical device according to claim 1, wherein said composite optical device is a laser coupler.

10. A method for making an optical coupler, comprising the steps of:

providing a support body having a light detector on said support body;

providing a bar-shaped microprism having a length not less than twice the width thereof and having total reflection and half mirror surfaces;

coating said total reflection and half mirror surfaces of said microprism with a hydrophilic material, said material characterized by a hydrophilic property which prevents silicone resin swarf from adhering to said coated surfaces;

bonding said microprism to said support body with an adhesive; and cutting said optical element and said support body while applying a liquid containing water to portions which are cut.

11. The method of claim 10, wherein said adhesive is a resin which sets when exposed to ultraviolet rays.

* * * * *